US009602481B2

(12) United States Patent
Bernardino

(10) Patent No.: US 9,602,481 B2
(45) Date of Patent: Mar. 21, 2017

(54) GENERATION OF SHORT KEY FOR COMMUNICATIONS

(71) Applicant: Morum LLC, Boca Raton, FL (US)

(72) Inventor: Morum Bernardino, Minas Gerais (BR)

(73) Assignee: Morum, LLC, Coral Gables, FL (US)

( * ) Notice: Subject to any disclaimer, the term of this patent is extended or adjusted under 35 U.S.C. 154(b) by 163 days.

(21) Appl. No.: 14/515,677

(22) Filed: Oct. 16, 2014

(65) Prior Publication Data

US 2016/0112388 A1   Apr. 21, 2016

(51) Int. Cl.
| | |
|---|---|
| *G06F 21/00* | (2013.01) |
| *H04L 29/06* | (2006.01) |
| *H04L 12/22* | (2006.01) |
| *H04L 9/32* | (2006.01) |

(52) U.S. Cl.
CPC .......... *H04L 63/062* (2013.01); *H04L 63/068* (2013.01); *H04L 2463/102* (2013.01)

(58) Field of Classification Search
CPC  H04L 63/062; H04L 63/068; H04L 2463/102
See application file for complete search history.

(56) References Cited

U.S. PATENT DOCUMENTS

| | | | |
|---|---|---|---|
| 7,447,693 B2 | 11/2008 | Wilding et al. | |
| 8,332,315 B2 | 12/2012 | Tullis | |
| 8,407,121 B2 | 3/2013 | Paintin | |
| 8,447,693 B2 | 5/2013 | Lynch et al. | |
| 8,577,292 B2 | 11/2013 | Huibers | |
| 8,655,773 B1 | 2/2014 | Fasoli et al. | |
| 8,768,838 B1 | 7/2014 | Hoffman | |
| 2002/0136407 A1 | 9/2002 | Denning et al. | |
| 2006/0022048 A1 | 2/2006 | Johnson | |
| 2012/0054046 A1 | 3/2012 | Albisu | |

(Continued)

FOREIGN PATENT DOCUMENTS

DE   EP 2267976 A1 * 12/2010 ........... H04L 63/061

OTHER PUBLICATIONS

Sirke Reimann, Markus Dürmuth; "Timed revocation of user data: long expiration times from existing infrastructure"; Oct. 2012; WPES '12: Proceedings of the 2012 ACM workshop on Privacy in the electronic society; Publisher: ACM; pp. 65-73.*

(Continued)

*Primary Examiner* — Shewaye Gelagay
*Assistant Examiner* — Courtney Fields
(74) *Attorney, Agent, or Firm* — McDonald Hopkins LLC

(57) ABSTRACT

Systems and methods for generation and use of short keys are disclosed. The systems and methods include the generation of a short key based on the location of a first device that requests the generation of the key. The short key is sent to the first device, which in turn communicates the short key to a second device, through a display, print receipt, direct communication, or other means. The short key is entered into the second device, which in turn communicates the entered short key to a server along with location information corresponding to the second device. The server authorizes communication between the first and second devices after it determines that the short key sent by the second device matches one of the keys active in a region corresponding to the location of the second device.

17 Claims, 8 Drawing Sheets

(56) References Cited

U.S. PATENT DOCUMENTS

2012/0144464 A1 6/2012 Fakhrai et al.
2013/0208893 A1 8/2013 Shablygin et al.
2014/0304505 A1 10/2014 Dawson

OTHER PUBLICATIONS

International Searching Authority/US, International Search Report and Written Opinion issued in PCT/US15/55340, mailed Jan. 11, 2016.

* cited by examiner

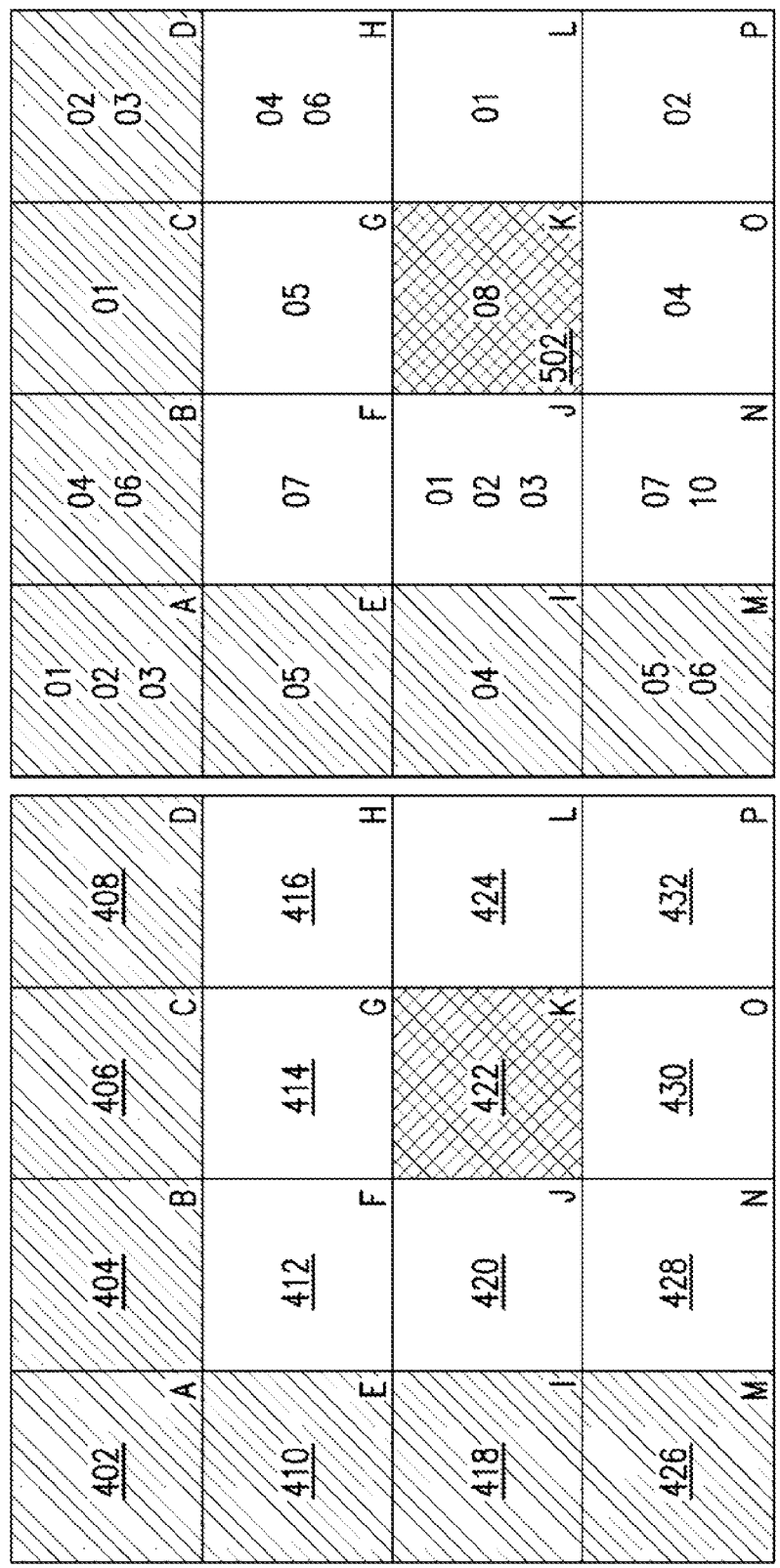

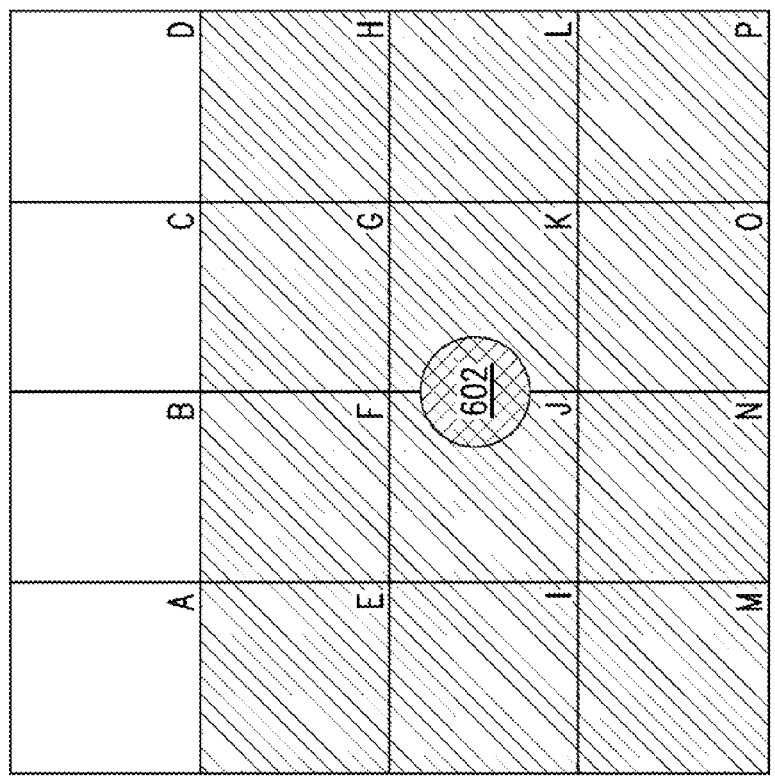

GENERATION OF SHORT KEY FOR COMMUNICATIONS

BACKGROUND OF THE INVENTION

Field of the Invention

The present invention generally relates to the exchange of information by electronic devices. More particularly, the present invention relates to the generation of a short key when establishing a connection or it is desired to share information over a period of time through use of one or more devices at a specific location.

Background

Unique keys are typically used to identify database records. Exemplary unique keys include telephone numbers and credit/debit card numbers. A telephone number can be considered a unique key because the combination of the country code, area code and the telephone number is always unrepeatable, so whenever this number is dialed, the dialing device will connect to the same end device, destination, or end user if the call is forwarded. Credit or debit card numbers may also serve as unique keys, since the number of an activated card will never be the same as the number of another activated card.

Exchanges of information with unique keys require the user to use or rely on very long codes, making the process difficult. Thus, there is a need in the art to reduce the unique key size for users to exchange information, in other words, there is a need for an exclusive code to be used in time and space.

SUMMARY

The following presents a simplified summary of the invention, in order to provide a basic understanding of some aspects of the invention. This summary is not an extensive overview of the invention. Rather than specifically identify key or critical elements of the invention or to delineate the scope of the invention, its purpose, inter alia, is to present some concepts of the invention in a simplified form as a prelude to the more detailed description that is presented later.

In one embodiment, a short key is generated when establishing a connection or it is desired to share information over a period of time through use of one or more devices at a specific location. The present invention includes processes to generate short keys based on device location.

The following description and the annexed drawings set forth in detail certain illustrative aspects of the invention. These aspects are indicative, however, of bin a few of the various ways in which the principles of the invention may be employed and the present invention is intended to include all such aspects and their equivalents. Other advantages and novel features of the invention will become apparent from the following description of the invention when considered in conjunction with the drawings.

BRIEF DESCRIPTION OF THE DRAWINGS

The drawings, in which like numerals represent similar parts, illustrate generally, by way of example, but not by way of limitation, various embodiments discussed in the present document.

FIG. 4 shows which regions alter the process of another for short key generation purposes in accordance with one embodiment.

FIG. 5 is a snapshot of FIG. 4 with some active short keys in accordance with one embodiment.

FIG. 6 shows a device in more than one region in accordance with one embodiment.

FIG. 7 is a snapshot of FIG. 6 with some active short keys in accordance with one embodiment.

DETAILED DESCRIPTION OF ILLUSTRATIVE EMBODIMENTS

Figure 1:
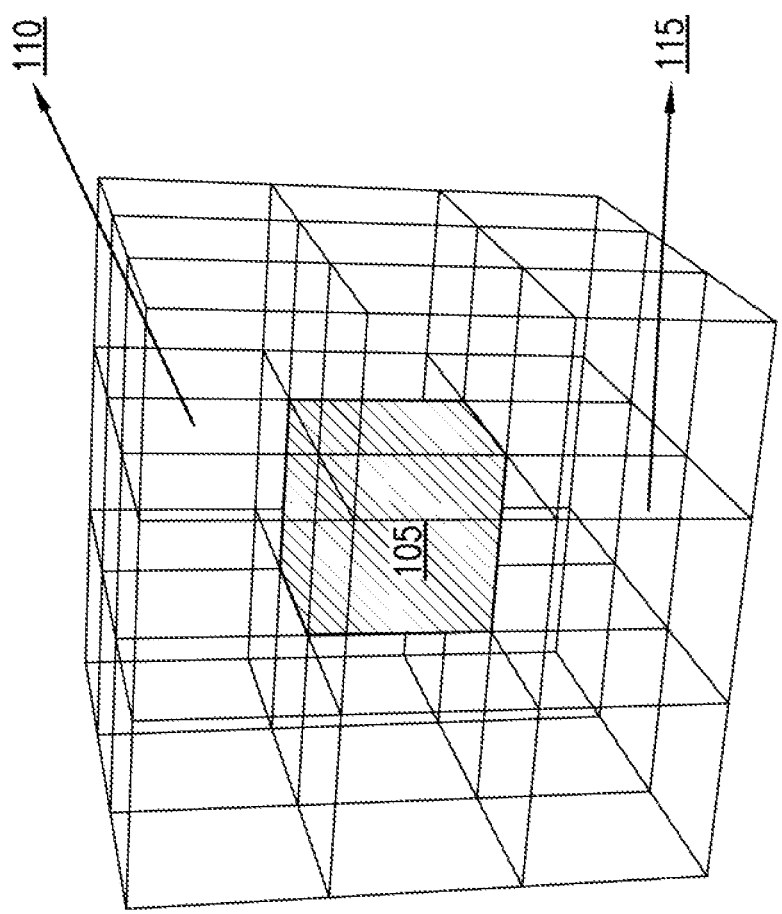
FIG. 1 shows an exemplary arrangement of regions in accordance with one embodiment.

Reference will now be made in detail to embodiments, examples of which are illustrated in the accompanying drawings. The following description refers to the accompanying drawings, in which, in the absence of a contrary representation, the same numbers in different drawings represent similar elements. The implementations set forth in the following description do not represent all implementations consistent with the claimed invention. Instead, they are merely some examples of systems and methods consistent with certain aspects related to the invention.

The "short key" may be defined as a sequence of characters (numbers, letters, or a combination thereof) that doesn't repeat in a determined time and space and that may be generated when one device is operated to create a connection or share information over a period of time through use of one other device or more devices at a specific location. A status report sent by a device to a server may request the creation of a connection or sharing information. The meaning of "period of time" and "specific location" will become apparent to a person of ordinary skill, in the art upon, review of the illustrative embodiments.

In accordance with one embodiment in the present disclosure the device that, requests the generation of the short key may be referred to as a "first device." Other devices that will complete the use of the short key may be referred to as "second device," "third device," etc. The group of servers and software that generate the short key may be referred to as "server."

The devices may include devices with Internet or other network connection, such as computers, smartphones, tablets, cashier machines or point-of-sale devices, ATMs, printers, etc.

The devices may be configured with profiles corresponding to persons or companies. A profile may be set to or associated with more than one device. For example, the profile of an ATM may correspond to a bank, the profile of a cashier machine may correspond to a store, the profile of a smartphone may correspond to a person, etc. In one embodiment, each profile has an owner referred to as a "user." The persons that actually use or operate the devices may be referred to as "operators." The devices can have users and operators being the same person or can have operators different from the users. The term "operator" generally used in the present disclosure when user and operator are different persons; in other instances the term "user" is used to refer to the user and operator being the same person or entity.

The action to request the server to generate the short key can be made by pressing a key or button on the device, touching (include gesture) a touch screen of the device, through voice activated commands received by the device, moving the device if it contains an accelerometer, by a remote control, etc. The "specific location" may be referred to as a "region" in the present disclosure. A region may be defined as an area defined by 3D geographical coordinates or boundaries that divides or groups devices into sets. This area may be defined in three dimensions, thus it can have a width, a length and a height, and as a result a region can have adjacent/neighboring regions to its side, above it and below it. Some of the figures illustrate the regions in two dimensions for ease of explanation.

The process of defining a region may be done directly by the server considering the availability and accuracy of localization systems. The localization systems may include the GPS (Global Positioning System), BDS (BeiDou Navigation Satellite System), the Galileo GNSS (Global Navigation Satellite System), iBeacon, cellular networks, Wi-Fi, Internet IP, expressly provided by the user, or any other method that can be used to define the positioning of a device.

Generally a region may be set using latitude, longitude and altitude for each point and converted for other localization systems, but a region can be created without latitude, longitude and altitude information. Sometimes an identifier specifying a network node with which the devices are in communication with may be sufficient to create a region. For example a region may be created by using just the internet IP associated with a subway train area, since the GPS, BDS, or other location systems might not have signal reception there.

FIG. 1 shows 27 cubes, each cube representing a different region. A region may have different shapes of a cube. The shadowed cube (105) has adjacent cubes (below, above and to its side). In FIG. 1 each region has three dimensions, a width, a length and a height. For example, the shadowed cube (105) may be a region set by the street level, the cube above it (110) may be the region corresponding to the rooftop of a building and the cube below it (115) may be the region corresponding to a subway station. The term "regions" is analogous to the cellular telephone regions typically defined by service providers as hexagons or circles, except that a region, as used herein, may be comprised of 3D shapes such as cubes, spheres, polyhedrons, spheres, ellipsoids, cylinders, cones, etc.

A region can overlap with another region, in part or completely. In that case, the two regions are considered neighbors. A delimited zone in a region can be exactly the same as one generated by a localization system with a radius of uncertainty, and thus there will be a region for each device.

In one embodiment, the localization systems described above may provide the position of the device with an uncertainty radius, or they can provide different radii with different levels of confidence. They may also provide a horizontal accuracy different from the vertical accuracy. That means that the localization systems do not necessarily guarantee that the devices are exactly at the location identified or determined; they can provide a possible location inside a solid geometry. This geometry can be in more than one region, which doesn't imply that the device is in more than one region, but that the accuracy of the localization system approximately determines in which region the device is located at. If the localization system is unable to determine in which region the device is in, the server may unify the possible regions where the device may be located at and use this unified region in the short key generating process.

The "period of time" may be defined as the period that the short key is available for use until its expiration. The first device user may set this expiration time. Each short key may have a different expiration period. In one embodiment, the second devices users, third devices users, etc. can only use the short key during the period between the time that the short key was generated and its expiration.

The short key can be used for different applications. At the same region and at the same time, it is possible to have short keys with different applications. Exemplary applications include: sharing photos, videos, music, or contacts; joining a network; sending data to a printer; mobile payments; money withdrawal; etc.

Figure 2:
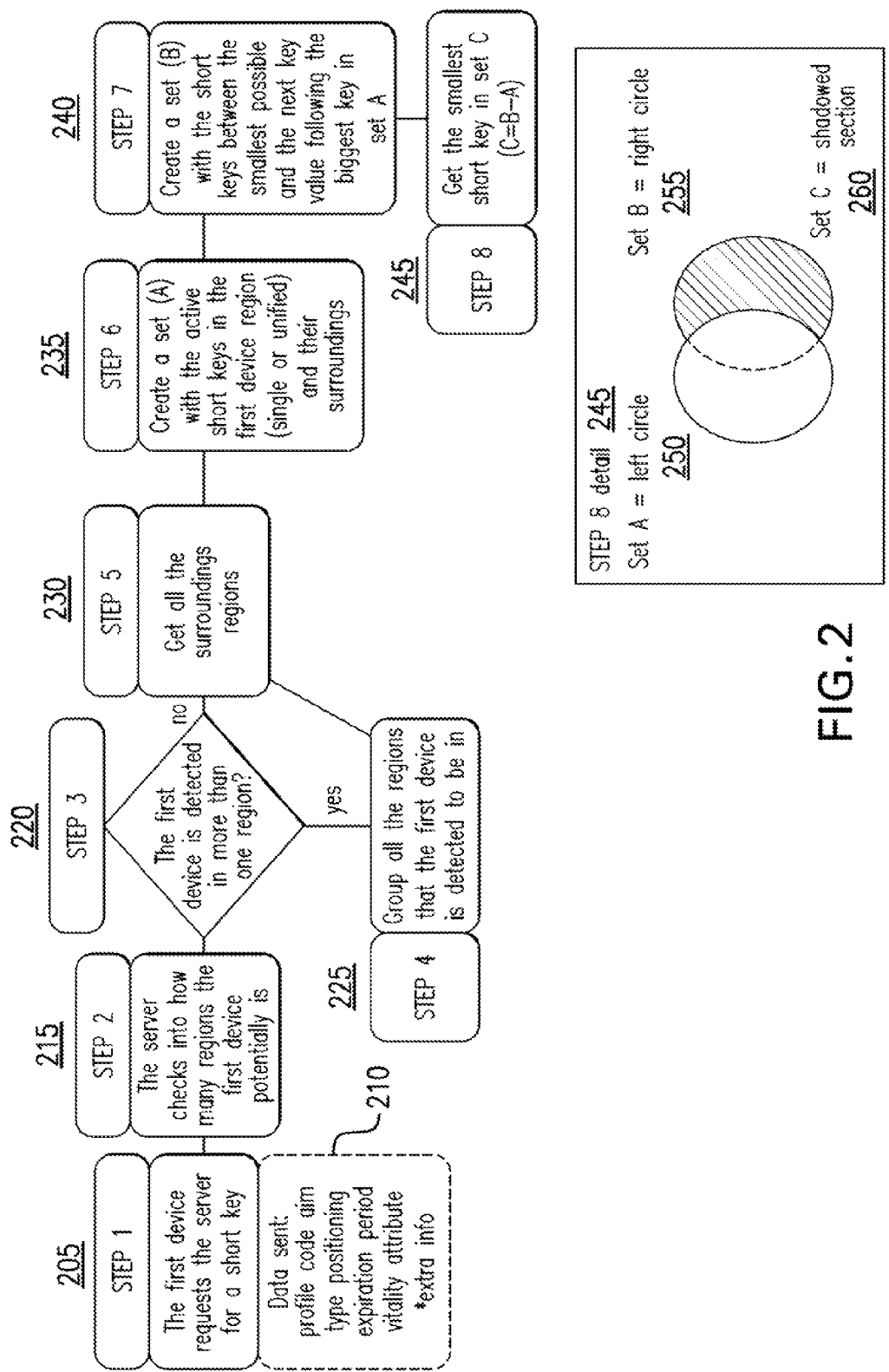
FIG. 2 is a flowchart, of the short key generating process in accordance with one embodiment.

In the embodiment illustrated in FIG. 2, the short key generation process may include eight steps. In STEP 1 (205), the first device requests the server a short key. This request is sent to the server with the profile identifier code, the device location (provided by any one of the localization systems describe above), the expiration period, identification of the application for the short key, the vitality attribute (e.g., a setting or attribute of the short key that indicates, determines or flags when the short key has been used and that can be used in order to disable the short key) and any additional information for each application (210). In STEP 2 (215) the server checks into how many regions the first device is in. STEP 3 (220) determines that if the first device is in more than one region, then the process goes to STEP 4 (225); and if the device is only detected in one region, then the process goes to STEP 5 (230). STEP 4 (225) groups all the regions that the first device ears be in. STEP 5 (230) creates a list of all the regions surrounding or adjacent to the first device region (single or unified). In STEP 6 (235) the server creates a set (set A 250) containing all the active short keys in the first device region and all of its surroundings at that moment as members. In STEP 7 (240) the server creates a set (set B 255) containing all the short keys that can be generated. The set B is limited between the lowest possible short key value in the system and the next key value or upcoming key value following the largest key value in set A (250) given by STEP 6 (235). For example, in STEP 7, in one embodiment, to determine which short keys can be used, the system, needs a set with all possible short keys that can be used, and then removes from the set the short keys that are already in use. Since a set with all possible keys can be infinite in nature, the set is limited to include a range of possible keys between the lowest key value in the system and the next key value following the largest short key value in use which is an element of set A. In one embodiment, the set B includes a range of keys formed by a range of all keys that fall between the key with the lowest possible value for the entire system and the key having the next key value following the largest key value in set A. In mathematical form this can be expressed, as follows: A={x1, x2, x3, x4 . . . xN} and B=[y, xN+1], assuming that key y is the key with the lowest possible value in the entire system. As used herein, sets denominated with "[ ]" refer to closed intervals, while the sets denominated with { } list specific elements in the set.

In STEP 8 (245) the server generates the short key using the smallest member from the set C (260) defined as the exclusion of the set A (250) from B (255) (C=B−A) and using the date and time that the request was received and the expiration period sent in STEP 1 (205). Thus the short key will be unique for the first device requested region and during the period between the request and the key expiration time.

Figure 3:
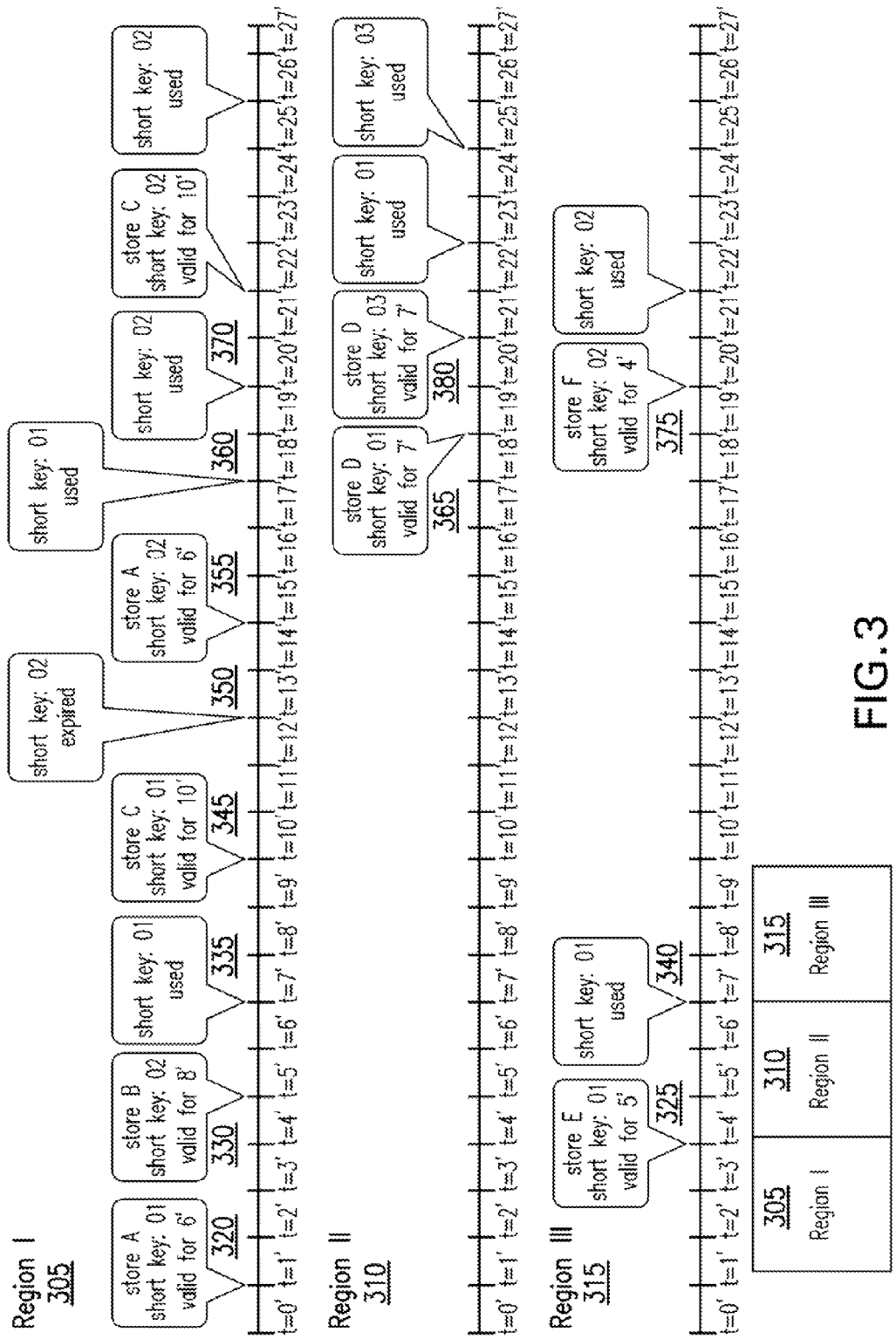
FIG. 3 is a timeline of the short key generation process in accordance with one embodiment.

FIG. 3 shows a short key generation and use timeline with three regions: region I (305), region II (330) and region III (315). The region I (305) has only the region II (310) adjacent thereto, the region III (315) has only region II (310) adjacent thereto, and region II (310) has region I (305) and region III (315) adjacent thereto. FIG. 3 illustrates how the short keys of the neighboring regions alter the short key generation process in a certain region. In the embodiment illustrated in FIG. 3, there are six devices that request generation of the short key. Each one in a single process may be characterized as a first device, but in FIG. 3 for ease of explanation, each one was designated by a letter—from A to F. That is, FIG. 3 illustrates several "first devices" as the term is used herein, but they are designated with letters in FIG. 3 for ease of explanation. The timeline illustrated in FIG. 3 does not involve second devices. In the illustrated embodiment, each region (region I (305), II (310) and III (315)) may have a timeline divided into 28 different instances (t) from 0' to 27'. The device A may request (320) a short key in region I (310) at t=1' with a key expiration period of 6'. That means that when t>7' the short key will be set as expired by the server if it was not used. The server provides the 01 sequence as the short key. At t=4' the device E (325) requests a short key in region III (315) and receives a 01 key. After that, there are two short keys equal to 03 illustrated, but the short keys are in different regions I (305) and III (315), and the regions are not neighboring. At t=5' the device B (330), in the same region of device A, requests a short key and receives a 02 key, because 02 was the next available short key since 01 was active at t=5'. At t=7' the short key 01 was used (335). At t=10' the device C in the same region of the device A and B requests a short key and receives a 01 short key (345). Once the short key 01 provided to device A at t=1' (320) and used at t=7' (335) the key becomes available again. At t=13' The short key 02 expires (350). At t=15' the device A requests a short key in region I (310) and receives a key 02 (355). At t=18' short key 01 is used (360) in region I (310). At t=19' the device D requests (365) a short key in region II (310) and receives a 01 key. At t=20' the short key 02 is used (370) in region I (305) and the device F requests (375) a short key in region III (315) and receives a key 02, because short key 01 was already active in region II. At t=21' the device D requests a short key and receives a 03 key (380), because short key 01 was active in the same region, and short key 02 was active in the neighboring region III (315).

Referring back to FIG. 1, the short key generating process in the region designated by the shadowed cube (105) is altered by all the active short keys in the surrounding regions (transparent cubes). In the embodiment illustrated in FIG. 1, the 26 other cubes influence the key provided to the shadowed cube (105).

FIG. 4 shows 16 regions each one represented by a square designed by a letter ranging from A to P. The regions F (412), G (414), H (416), J (420), L (424), N (428), O (430) and P (432) alter the short key generating process in region K (422), but the regions A (402), B (404), C (406), D (408), E (410), I (418) and M (426) don't influence the key generation process for region K (422).

FIG. 5 shows a snapshot of a specific instance corresponding to the regions in FIG. 4. The region K (502), the last to request a short key, has 1 active short, key 08, because the short keys 01, 02, 03, 04, 05, 06, 07 and 10 are active in the neighboring regions. The set of short keys is A={01,02,03,04,05,06,07,10} (e.g., set A is comprised of active short keys with the exception of region K). The set of short keys between the smallest short key possible and the largest short key in set A plus one upcoming or next key value is the set B={01,02,03,04,05,06,07,08,09,10,11}. Doing the operation B−A=C={08,09,11}, the smallest short key in set C is 08. If the short keys remain active until the next request in the region K, the next short key will be 09.

FIG. 6 shows the same 16 regions of FIG. 4, but at another time instance and with one device (602) in two regions J (604) and K (606). FIG. 7 shows a snapshot of the embodiment illustrated in FIG. 6. During the short key generating process for the device represented by the circle (702), the server groups the regions J (722) and K (724) and as consequence the neighbors will be the regions E (712), F (714), G (716), H (718), I (720), L (726), M (728), N (730), O (732) and P (734). Note that the region F (714), H (718) and O (732) has a short key designated by 04, but they are not neighbors, thus the device (702) can get the 05 as the short key.

The short key may be a sequence of characters with a flexible length. The length of the short key starts with one digit and can be enlarged depending on the number of requests being made over a period of time in a particular region. The characters of the short keys can be alphanumeric. In the same region it is possible to have short keys with different lengths. For example, a device in Times Square in New York City may receive a short key with a greater length than a device on a farm. The localization system accuracy may have an effect or alter the length of the short keys, because if they are not accurate enough and the system determines that a device could be in 30 regions, the short key generating process will be influenced by all the 30 regions and their neighbors. Location systems can be inaccurate and determine that a dispositive or device is within an area corresponding to different regions. The less reliable or accurate the location system is, the more regions may be associated with the possible location area of the device and consequently, more characters may be required to create the short key, resulting in a longer short key.

The server is responsible for setting the short key as expired if it is not used within an expiration time. The first device user can cancel the request for a short key, and when this occurs, the server will set the short key as canceled.

The server will set the short key as used when the vitality attribute configured by the first device is met. The vitality attribute may be based on or determined, by the purchase price or the number of times the key is used, or by both at the same time. For example, a key can be set for use of up to two times and for a value of $ 100.00 when used in connection with payment of a restaurant bill where people intend to split the bill. Examples of this configuration include, but are not limited to: number of uses of the short key by one user; number of different users that can use a short key; data transfer size; use of the short key for payment when reaching a specific value; etc. When the short key reaches the expiration time, the vitality attribute is of no consequence, and the server will set the key as expired. For example, when a short key is generated for payment at a restaurant, the customers may split the bill, so each one can make a partial payment of the bill with the same short key. The server will set the short key as used when the total amount of the bill is reached.

Since the short key is generated, the first device receives from the server the sequence of characters that compose the short key. Thus the second devices users need to know the short key in order to use them. They can get the short key by reading it on a display, by reading it from a paper, by communicating with the first device user, etc.

Figure 8:
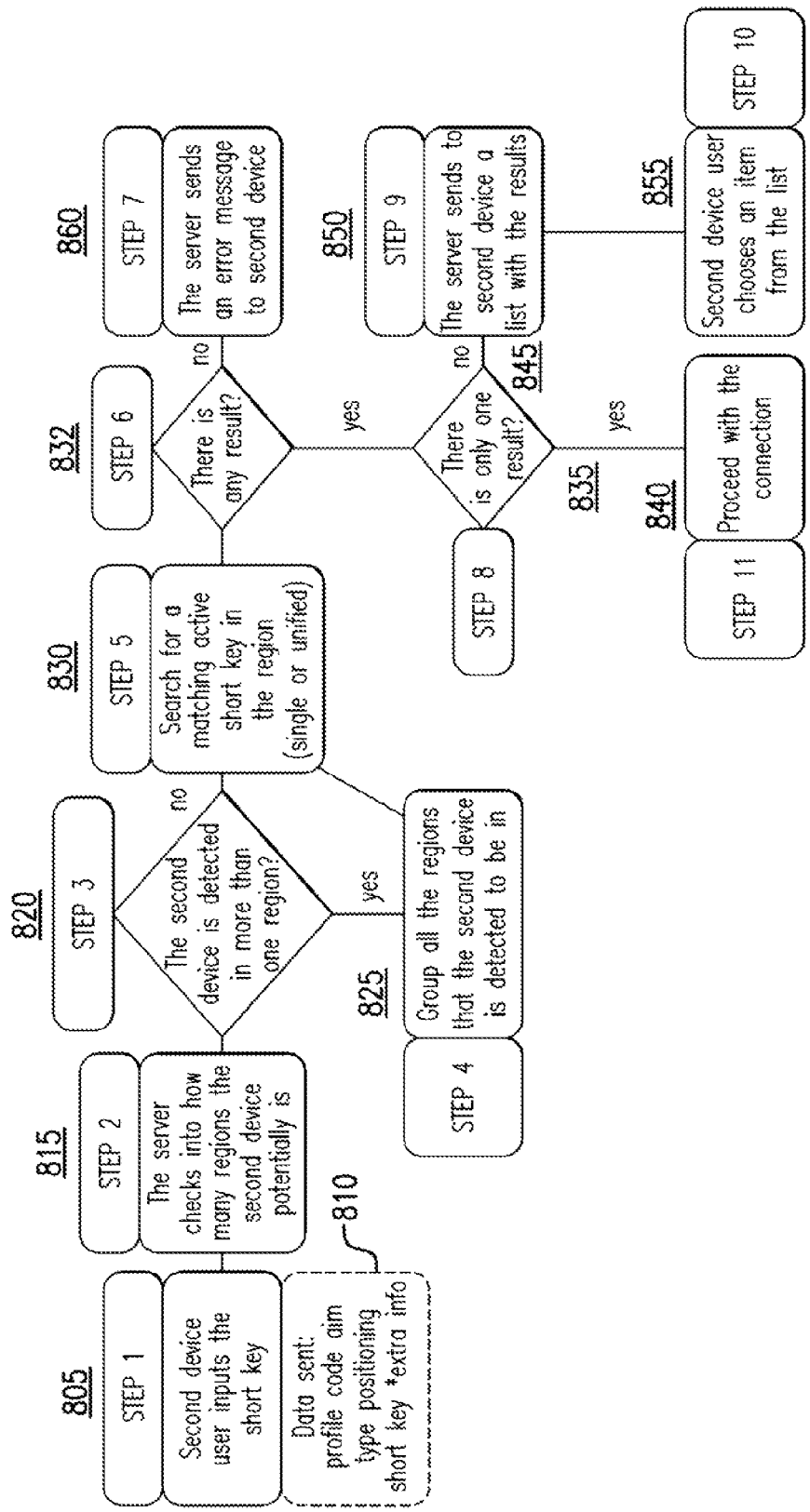
FIG. 8 is a flowchart of the short key search process in accordance with one embodiment.

In the embodiment illustrated in FIG. 8, once in possession of the short key, the second device user may enter (805) the short key in the second device trough typing, voice activated commands, or other input method supported by the second device. After inputting the short key in the second device, an optional step could be necessary to gain permission to proceed (e.g., a password, finger print, voice recognition, picture recognition, etc.), then the user can take an action such as pressing a key or button on the device, touching (include gesture) a touch screen of the device, through voice activated commands received by the device, moving the device if it contains an accelerometer, by a remote control, etc., in order to send a status report (810) to the server. This status report (810) sent by the second device may have the specified application (purpose for generation and use of short key) of the short key, the sequence of characters of the short key, the second device location (given by any of the aforementioned means and considering the uncertain radius) and any additional info for each application.

After receiving the status report from the second device, the server will determine in which region the second device is in (815). Like the first device, the second device could be in more than one region (820), so the server will join (825) those possible regions to guarantee an accurate result. Using this region (unified or single) the server will search (830) for an active short key that is equal to the one sent in the status report (810). The number of search results may vary depending on the second device localization system accuracy. If the location, accuracy is sufficient to determine that the second device is in only one region or in a group of regions where the short key is unique (835) (i.e., when the search returns only one record), then the server will establish the connection (840). If the positioning accuracy is not sufficient to determine that the second device is in a group of region that the short key is unique (845), then the search will return more than one record and the server will send (850) to the second device a list with those records. Then the second device user may have to choose (855) with which one the connection will be made. That is, after the list has been sent to the second device, the user will have to choose an item from the list to connect with. For example, in FIG. 5 the short key 5 appears in E, G and M. If the accuracy of the second device is poor and encompasses 16 regions, a list will, be sent to the second device with the name of the first devices in the regions E, G M that requested the key 05. So the second user will choose which of them the second device will connect with. If the server doesn't find any record (832) compatible with the information sent by second device the server will return an error message (860).

Figure 9:
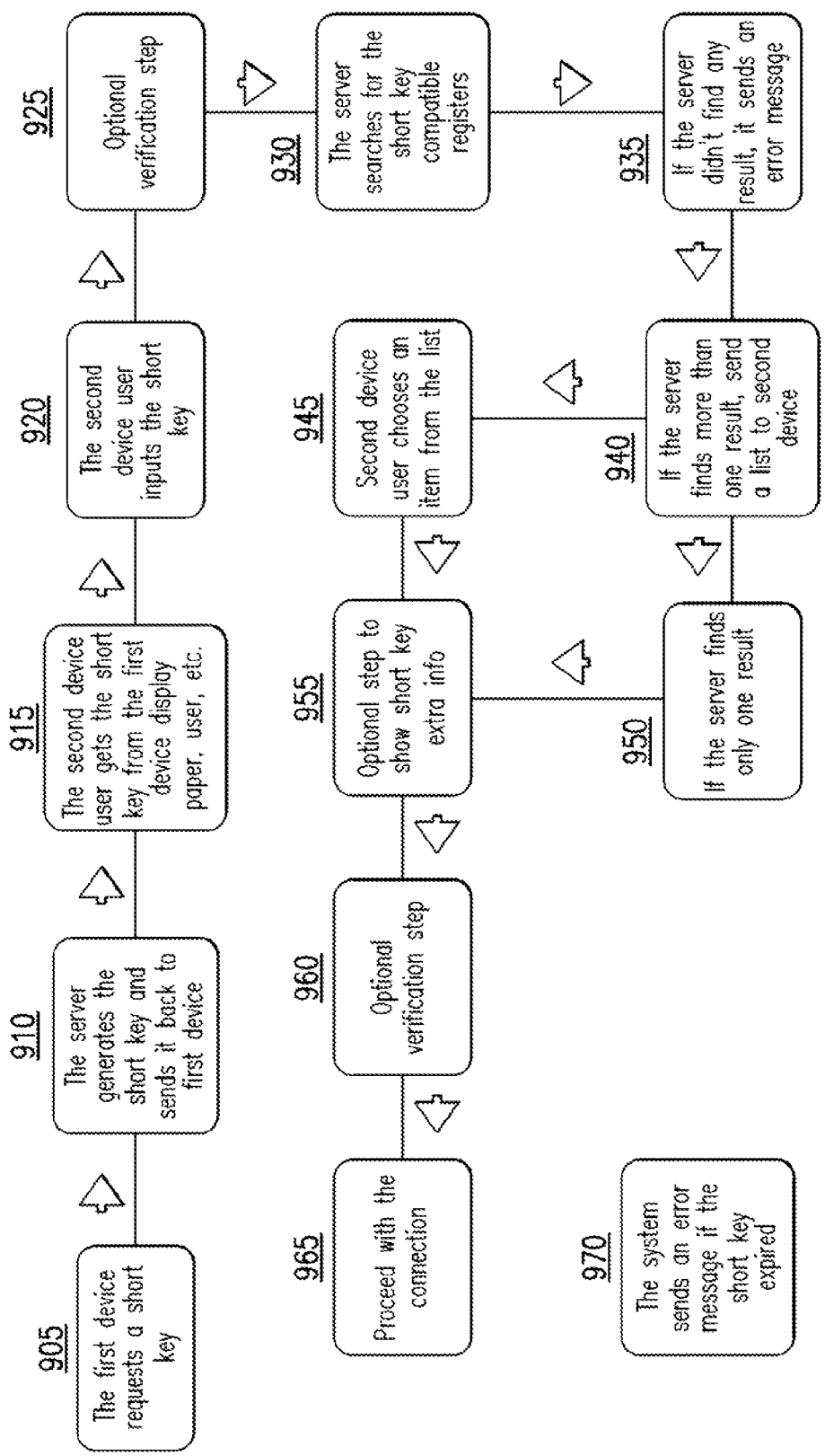
FIG. 9 is a flowchart of the overall process in accordance with one embodiment.

FIG. 9 is a flowchart of the overall process in accordance with one embodiment. In step (905), the first device requests a short key. In step (910), the server generates the short key and sends it back to the first device. In step (915), the second device user obtains the short key from the display of the first device, from a printout, from the first device user, or other means. In steP (920) the second user enters the short key. In step (925), the server verifies identity of second user (e.g., through use of a password) and validity of the short key. In step (930), the server searches for short key compatible registers (for example, FIG. 8, steps between 805 and 830). In step (935), if the server does not find any matching results, it sends an error message. In step (940), if the servers finds more than one short key, it sends a list to the second device so that the second device user can choose an item from the list (945) (e.g., a first device to communicate with). If the server finds only one result (950), then the short key identified may be sent to the second device along with additional information (955). In step (960), additional verification or authentication may take place (for example, through, use of password). In step (965), the connection is established. If the short key has expired, the server sends an error message (970).

Figure 10:
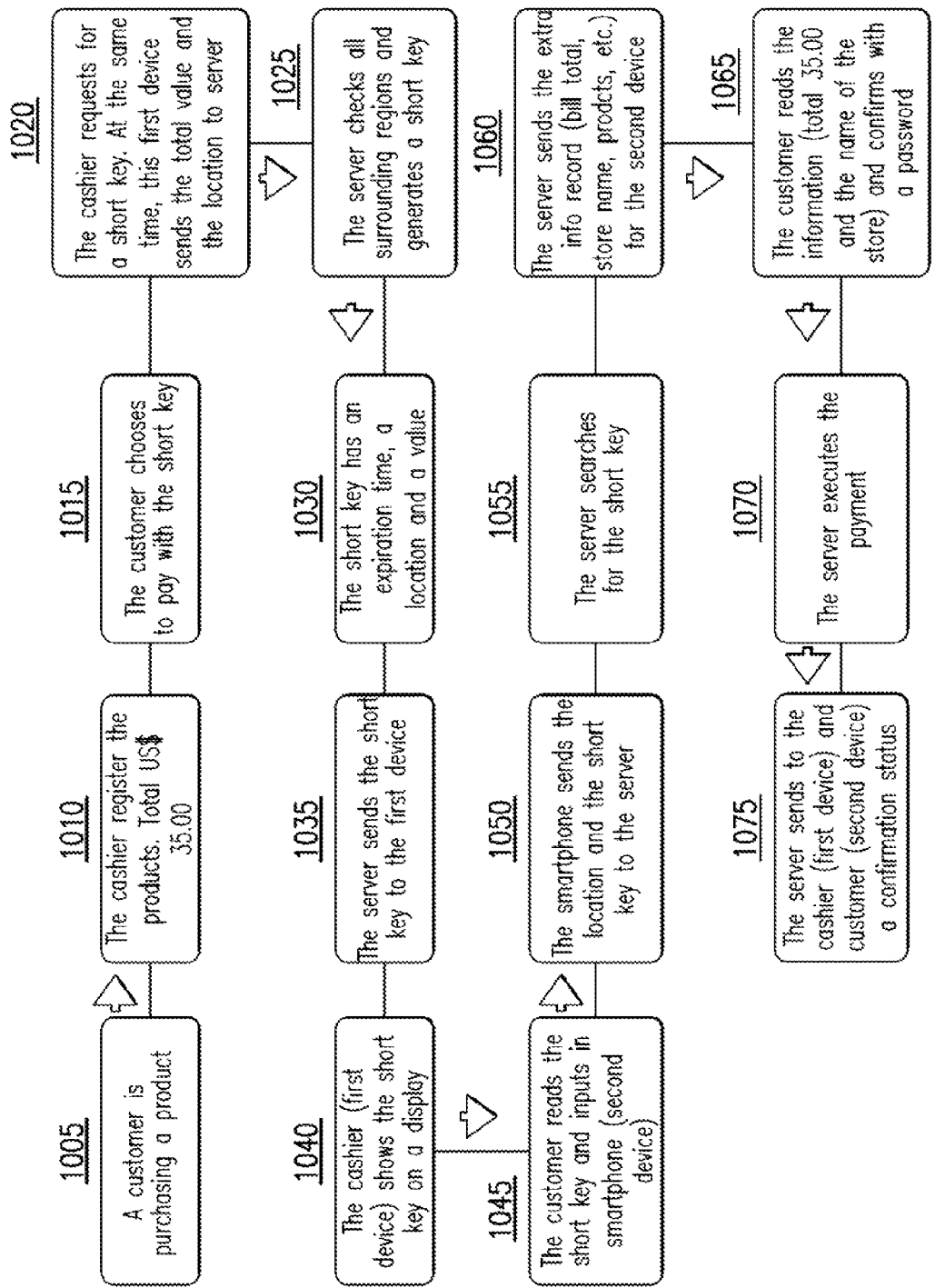
FIG. 10 is a flowchart describing use of a short key for payment in accordance with one embodiment.

Referring to FIG. 10, the steps implemented when the short key application is a payment remains the same for the short key generating process (1020) and for the short key search (1055), but after that, the server sends to the second device additional information (1060) with the total value of the transaction, the name of the user that will receive the payment, the list of the products purchased, etc. With this information on the second device, the user confirms (1065) the purchase with a verification step. If the second device user confirms the purchase, the server will, execute (1070) the payment using a credit card, debit card, pre-paid card, relationship programs point or bank transfer. Thus the server will send (1075) confirmation to the first and second devices that the purchase was completed. If the user of the second device does not confirm the purchase the server will send to the first device a notification that the user has cancelled the purchase. The first device user could set up the short key to remain active if the second device user only retrieves it and didn't proceed or can set it to become disabled if the second device user just read it.

The communication between the first device and second, devices (including third device, forth device, etc.) may occur through the server, through an intermediary device or directly between them. This configuration is a consequence of the short key application.

A remote device can substitute the location of the first device. In this scenario the first device requests the short key, but when sending data to the server the remote device location is sent instead of the location of the first device. This process allows for the operator to use a device different from the device of the first user. For example, a person using a computer may want to purchase a product, over the Internet and use his smartphone to pay through use of the short key. The first device may be the computer hosting the website, which may be in the cloud, and with an unknown and different location from the second device. The second device may be a smartphone. The computer that the operator is using to access the site is the remote device that remotely accesses the first device. When the first device requests a short key, the location of the remote device may be used so that when the short key is entered in the second device, the server will be able to locate the second device because the position of the remote device and the second device are the same.

The invention claimed is:

1. A short key generation and use method comprising:
   at a server, receiving a request for a short key from a first device, the request including location information;
   at the server, determining whether the location information corresponds to one or more regions;
   if the location information corresponds to only one region, creating a list of regions adjacent to said one region, defining a set A to include short keys active in said one region and said regions adjacent to said one region
   or,
   if the location information corresponds to more than one region, grouping said more than one region into a unified region, and creating a list of regions adjacent to said unified region, defining the set A to include short keys active in said unified region and said regions adjacent to said unified region;

creating a set B comprising short keys ranging from the smallest key, in value, that the server can generate and the next key, in value, following the largest key, in value, in set A;

creating a set C comprising key values that said set A and said set B do not have in common;

selecting the smallest key, in value, in set C and generating the short key requested by the first device based on said smallest key in set C and the time and date of said request; and transmitting the short key requested by the first device to the first device for use as an authentication key to communicate with a second device.

2. The method of claim 1, wherein the request for a short key further comprises at least one of the following:
a profile identifier code;
an expiration period;
a vitality attribute; and
identification of the application for use with the requested short key.

3. The method of claim 2, wherein said vitality attribute is usable by the server to determine when said requested short key has been used.

4. The method of claim 2, wherein said vitality attribute is usable by the server to disable said requested short key.

5. The method of claim 2, wherein said vitality attribute is based on a purchase price.

6. The method of claim 2, wherein said vitality attribute is based on a number of times said requested short key is used.

7. The method of claim 2, wherein said vitality attribute comprises at least one of the following settings:
number of uses of the requested short key by a user;
number of different users that can use the requested short key;
data transfer size; and
use of the requested short key for payment when reaching a specific value.

8. The method of claim 2, further comprising allowing use of said short key for the first device during the period between a time of said request and said expiration period.

9. The method of claim 1, wherein said location information corresponds to a location for said first device.

10. The method of claim 1, wherein said location information corresponds to a location for a remote device associated with a user of said first device.

11. The method of claim 1, further comprising allowing use of said short key for the first device
in said only one region if said location information corresponds to only one region,
or,
in said unified region if said location information corresponds to said more than one region.

12. The method of claim 1, further comprising:
receiving from a second device an identification of an application for use with the requested short key, a second short key, and second location information corresponding to a location of the second device.

13. The method of claim 12, further comprising:
at the server, determining whether the second location information corresponding to the location of the second device corresponds to one or more regions;
if the second location information corresponding to the location of the second device corresponds to only one region, comparing the second short key with active short keys in said one region corresponding to the second location information and in regions adjacent thereto to identify one or more active short keys that match the second short key,
or,
if the second location information corresponding to the location of the second device corresponds to more than one region, grouping said more than one region into a unified region, comparing the second short key with active short keys in said unified region corresponding to the second location information and in regions adjacent thereto to identify one or more active short keys that match the second short key.

14. The method of claim 13, further comprising:
at the server, authorizing a communication between the first device and the second device when it is determined that a single active key identified matches the second short key.

15. The method of claim 13, further comprising:
sending an error message to the second device when it is determined, for either said one region or for said unified region, that no active key identified matches the second short key.

16. The method of claim 13, further comprising:
when it is determined, for either said one region or for said unified region, that more than one active key identified matches the second short key, sending to the second device a list of devices associated with said more than one active keys so that the user of the second device selects a device from said list for communication.

17. The method of claim 16, further comprising:
at the server, receiving from said second device a selected device for communication; and
authorizing a communication between the selected device and the second device.

* * * * *